US011301265B2

(12) United States Patent
Tokuchi

(10) Patent No.: US 11,301,265 B2
(45) Date of Patent: Apr. 12, 2022

(54) DETERMINING CONFLICTING PROCESSES IN FIRST AND SECOND FUNCTIONS BEFORE SETTING OF THE FIRST AND SECOND FUNCTIONS IN A FUNCTION MANAGEMENT TABLE IS COMPLETE

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 198 days.

(21) Appl. No.: 16/048,367

(22) Filed: Jul. 30, 2018

(65) Prior Publication Data
US 2019/0243667 A1    Aug. 8, 2019

(30) Foreign Application Priority Data
Feb. 2, 2018    (JP) .............................. JP2018-017417

(51) Int. Cl.
*G06F 9/451*    (2018.01)
*G06F 9/48*    (2006.01)
(Continued)

(52) U.S. Cl.
CPC .............. *G06F 9/451* (2018.02); *G06F 9/485* (2013.01); *G06F 9/542* (2013.01); *G05B 19/0423* (2013.01); *G05B 2219/25257* (2013.01)

(58) Field of Classification Search
None
See application file for complete search history.

(56) References Cited

U.S. PATENT DOCUMENTS 5,748,468 A * 5/1998 Notenboom .......... G06F 9/3877
326/37
5,902,352 A * 5/1999 Chou .................... G06F 9/4881
718/100
(Continued)

FOREIGN PATENT DOCUMENTS

JP    2004056466    2/2004
JP    2004248043    9/2004
(Continued)

OTHER PUBLICATIONS

"Office Action of Japan Counterpart Application", dated Nov. 30, 2021, with English translation thereof, p. 1-p. 9.

*Primary Examiner* — Meng Ai T An
*Assistant Examiner* — Michael W Ayers
(74) *Attorney, Agent, or Firm* — JCIPRNET

(57) ABSTRACT

An information processing apparatus includes a control unit. The control unit includes a processor and a memory. The processor is configured to set a function and another function in a function management table by respectively defining a plurality of first configurations utilized by the function to perform a process and a plurality of second configurations utilized by the other function to perform another process. Each of the plurality of first and second configurations includes instrument or software. The processor is configured to control a notification of a warning in a case where the plurality of first and second configurations includes a same configuration that is to be utilized by the function to perform the process and by the other function to perform the other process, and in a case where the process and the other process contradict with each other.

15 Claims, 7 Drawing Sheets

<FUNCTION MANAGEMENT TABLE>

| USER ID | FUNCTION ID | INSTRUMENT (WHOLE, PART) | SOFTWARE | TARGET | CONTENT |
|---|---|---|---|---|---|
| USER A | FUNCTION 1 | · DOOR OPENING/CLOSING SENSOR A<br>· LIGHTING APPARATUS B | | | LIGHTING APPARATUS IS LIGHTED IN CASE WHERE OPENING OF DOOR IS DETECTED. |
| USER A | FUNCTION 2 | · SCANNER C | · OCR SOFTWARE D<br>· BUSINESS FORM CREATION SOFTWARE E | · RECEIPT<br>· ACCOUNTING FILE F | CONTENT OF RECEIPT IS ADDED TO ACCOUNTING FILE IN CASE WHERE RECEIPT IS SCANNED. |
| USER B | FUNCTION 3 | | · WEB BROWSER G<br>· SHOPPING SITE H<br>· PURCHASE INSTRUCTION | · BRAND BAG J<br>(SHOPPING TARGET) | BRAND BAG J IS PURCHASED IN CASE WHERE BRAND BAG J IS EXHIBITED IN SHOPPING SITE. |
| USER B | FUNCTION 4 | | · PRESENTATION SOFTWARE K | · IMAGE<br>· PRESENTATION FILE | IMAGE IS ADDED TO PRESENTATION FILE IN CASE WHERE IMAGE AND PRESENTATION FILE ARE SELECTED. |
| USER C | FUNCTION 5 | | · DOCUMENT CREATION SOFTWARE L<br>· BUSINESS FORM CREATION SOFTWARE M | · DOCUMENT FILE<br>· ACCOUNTING FILE | CONTENT OF DOCUMENT FILE IS ADDED TO ACCOUNTING FILE |
| USER C | FUNCTION 6 | · TELEPHONE N | · DOCUMENT CREATION SOFTWARE P | | CONTENTS OF CONVERSATIONS ARE PRESERVED IN DOCUMENT |
| USER D | FUNCTION 7 | · DOOR OPENING/CLOSING SENSOR A<br>· SECURITY CAMERA Q | · NOTIFICATION SOFTWARE R | | SECURITY CAMERA PERFORMS IMAGING AND NOTIFIES USER OF DETECTION RESULT IN CASE WHERE OPENING OF DOOR IS DETECTED. |
| ... | ... | ... | ... | ... | ... |

(51) Int. Cl.
  *G06F 9/54*   (2006.01)
  *G05B 19/042* (2006.01)

(56) References Cited

U.S. PATENT DOCUMENTS

| | | | | |
|---|---|---|---|---|
| 8,316,355 | B2* | 11/2012 | Feng | G06F 8/456 |
| | | | | 717/135 |
| 9,529,644 | B1* | 12/2016 | Verma | G06F 16/245 |
| 10,601,876 | B1* | 3/2020 | Levy | H04L 63/0227 |
| 2003/0014468 | A1* | 1/2003 | Sudhakaran | G06F 9/524 |
| | | | | 718/104 |
| 2006/0294492 | A1* | 12/2006 | Sakai | H04N 1/00912 |
| | | | | 717/101 |
| 2008/0244583 | A1* | 10/2008 | Horikawa | G06F 9/466 |
| | | | | 718/101 |
| 2009/0002381 | A1* | 1/2009 | Harper | G06T 11/206 |
| | | | | 345/522 |
| 2009/0288031 | A1* | 11/2009 | Solaro | G06Q 10/06 |
| | | | | 715/772 |
| 2010/0023738 | A1* | 1/2010 | Sheehan | G06F 9/455 |
| | | | | 713/1 |
| 2011/0271286 | A1* | 11/2011 | Kemmler | G06F 8/71 |
| | | | | 718/106 |
| 2014/0244710 | A1 | 8/2014 | Sharma et al. | |
| 2015/0038121 | A1 | 2/2015 | Koum et al. | |
| 2015/0128131 | A1* | 5/2015 | Cao | G06F 9/45558 |
| | | | | 718/1 |
| 2015/0207689 | A1* | 7/2015 | Matsumoto | H04L 41/02 |
| | | | | 709/223 |
| 2016/0157068 | A1 | 6/2016 | Koum et al. | |
| 2017/0149978 | A1 | 5/2017 | Koum et al. | |
| 2018/0034969 | A1 | 2/2018 | Koum et al. | |

FOREIGN PATENT DOCUMENTS

| | | |
|---|---|---|
| JP | 2016517638 | 6/2016 |
| JP | 2016527638 | 9/2016 |

* cited by examiner

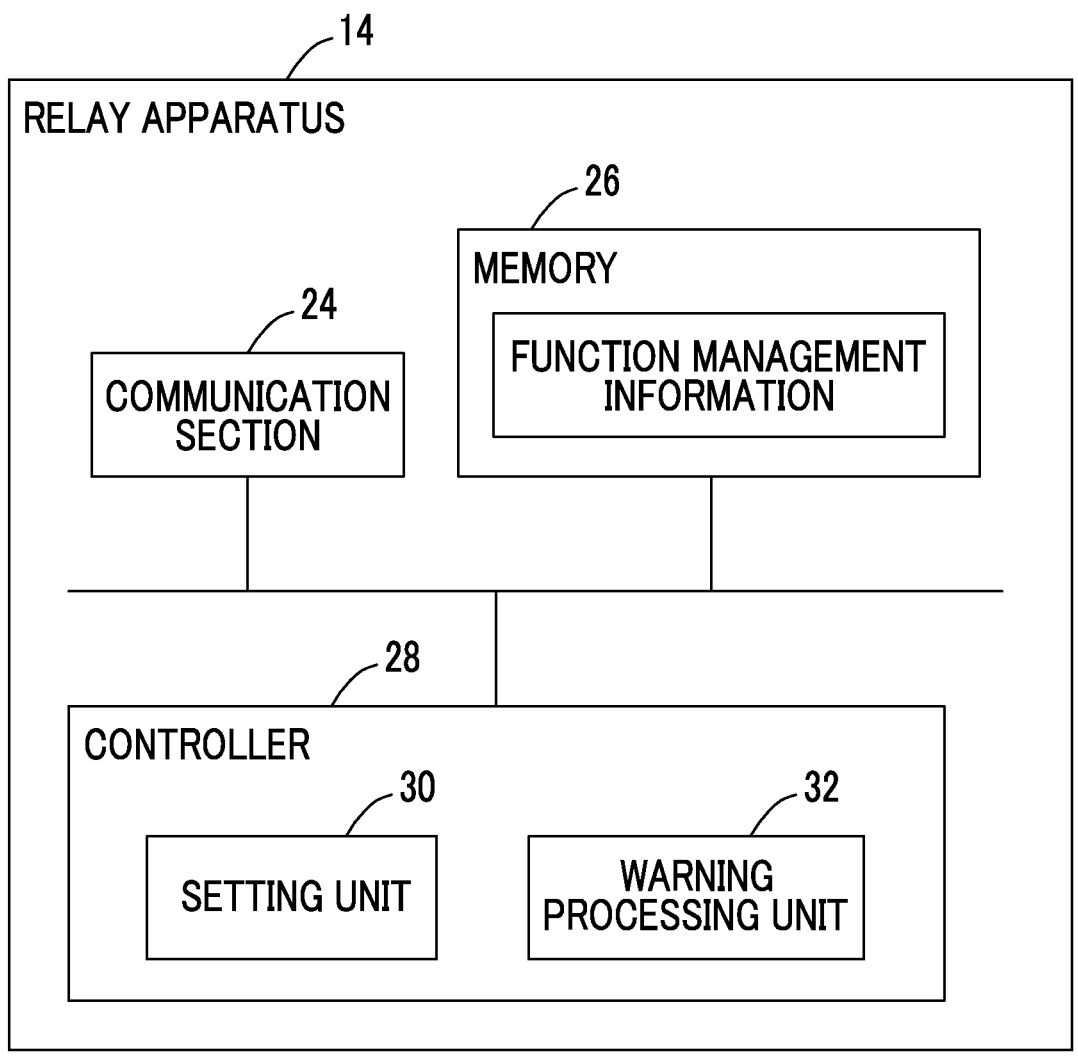

FIG. 4

<FUNCTION MANAGEMENT TABLE>

| USER ID | FUNCTION ID | INSTRUMENT (WHOLE, PART) | SOFTWARE | TARGET | CONTENT |
|---|---|---|---|---|---|
| USER A | FUNCTION 1 | · DOOR OPENING/CLOSING SENSOR A<br>· LIGHTING APPARATUS B | | | LIGHTING APPARATUS IS LIGHTED IN CASE WHERE OPENING OF DOOR IS DETECTED. |
| USER A | FUNCTION 2 | · SCANNER C | · OCR SOFTWARE D<br>· BUSINESS FORM CREATION SOFTWARE E | · RECEIPT<br>· ACCOUNTING FILE F | CONTENT OF RECEIPT IS ADDED TO ACCOUNTING FILE IN CASE WHERE RECEIPT IS SCANNED. |
| USER B | FUNCTION 3 | | · WEB BROWSER G<br>· SHOPPING SITE H<br>· PURCHASE INSTRUCTION | · BRAND BAG J (SHOPPING TARGET) | BRAND BAG J IS PURCHASED IN CASE WHERE BRAND BAG J IS EXHIBITED IN SHOPPING SITE. |
| USER B | FUNCTION 4 | | · PRESENTATION SOFTWARE K | · IMAGE<br>· PRESENTATION FILE | IMAGE IS ADDED TO PRESENTATION FILE IN CASE WHERE IMAGE AND PRESENTATION FILE ARE SELECTED. |
| USER C | FUNCTION 5 | | · DOCUMENT CREATION SOFTWARE L<br>· BUSINESS FORM CREATION SOFTWARE M | · DOCUMENT FILE<br>· ACCOUNTING FILE | CONTENT OF DOCUMENT FILE IS ADDED TO ACCOUNTING FILE |
| USER C | FUNCTION 6 | · TELEPHONE N | · DOCUMENT CREATION SOFTWARE P | | CONTENTS OF CONVERSATIONS ARE PRESERVED IN DOCUMENT |
| USER D | FUNCTION 7 | · DOOR OPENING/CLOSING SENSOR A<br>· SECURITY CAMERA Q | · NOTIFICATION SOFTWARE R | | SECURITY CAMERA PERFORMS IMAGING AND NOTIFIES USER OF DETECTION RESULT IN CASE WHERE OPENING OF DOOR IS DETECTED. |
| ... | ... | ... | ... | ... | ... |

FIG. 7

WARNING

· ANOTHER COOPERATION FUNCTION WHICH IS EXECUTED UNDER IDENTICAL TRIGGER CONDITION IS ALREADY SET IN IDENTICAL INSTRUMENT.
· IN CASE WHERE THIS FUNCTION IS SET, CONTRADICTORY OPERATIONS OCCUR.
· CANCEL COOPERATION FUNCTION WHICH IS ALREADY SET OR SET ANOTHER COOPERATION FUNCTION.

FIG. 8

WARNING

· DO YOU CANCEL COOPERATION FUNCTION WHICH IS ALREADY SET AND SET THIS COOPERATION FUNCTION IN WHICH "LIGHTING APPARATUS IS UNLIGHTED IN CASE WHERE OPENING OF DOOR IS DETECTED"?

YES/NO

DETERMINING CONFLICTING PROCESSES IN FIRST AND SECOND FUNCTIONS BEFORE SETTING OF THE FIRST AND SECOND FUNCTIONS IN A FUNCTION MANAGEMENT TABLE IS COMPLETE

CROSS-REFERENCE TO RELATED APPLICATIONS

This application is based on and claims priority under 35 USC 119 from Japanese Patent Application No. 2018-017417 filed Feb. 2, 2018.

BACKGROUND

(i) Technical Field

The present invention relates to an information processing apparatus and a non-transitory computer readable medium storing a program.

(ii) Related Art

JP2016-527638A discloses a technique in which an IoT device receives a first set of data of the IoT device indicating each context, receives a second set of data of the IoT device indicating each current state, and determines an operation to be performed in a target IoT on the basis of the received data.

SUMMARY

Aspects of non-limiting embodiments of the present disclosure relate to an information processing apparatus and a non-transitory computer readable medium storing a program enabling a user to recognize a problem which may occur in a case where plural functions are set in a configuration performing the functions.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus includes a control unit that controls a notification of a warning in a case where setting of a function is received, and another function is already set in a configuration used for the function.

BRIEF DESCRIPTION OF THE DRAWINGS

Exemplary embodiment(s) of the present invention will be described in detail based on the following figures, wherein:

FIG. 3 is a block diagram illustrating a configuration of a relay apparatus;

FIG. 4 is a diagram illustrating a function management table;

FIG. 7 is a diagram illustrating a screen;
FIG. 8 is a diagram illustrating a screen.

DETAILED DESCRIPTION

Figure 1:
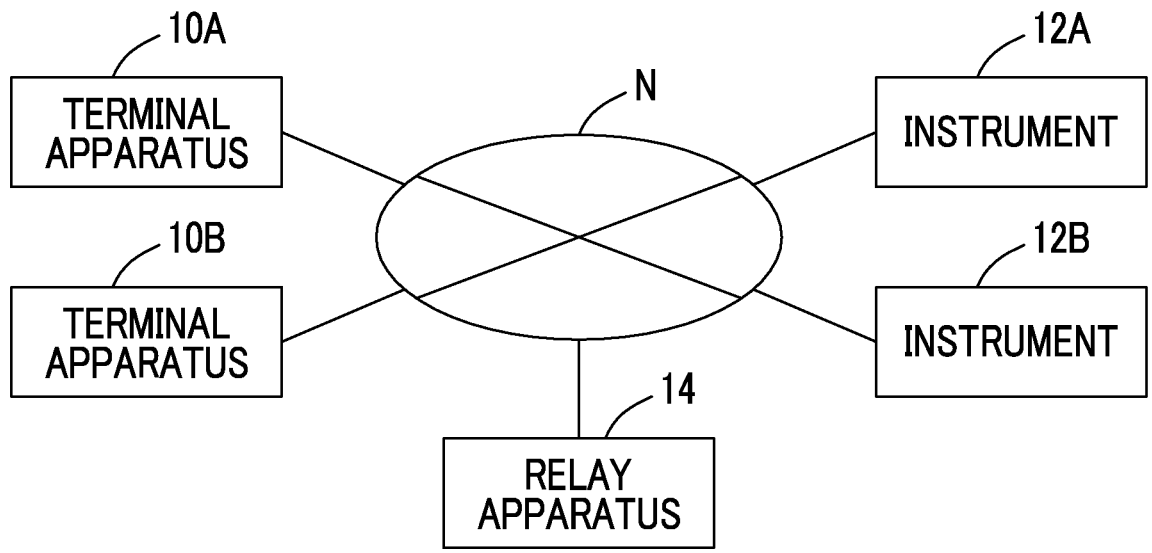
FIG. 1 is a block diagram illustrating a configuration of an information processing system according to an exemplary embodiment of the invention.

With reference to FIG. 1, an information processing system according to an exemplary embodiment of the invention will be described. FIG. 1 illustrates an example of an information processing system according to the present exemplary embodiment.

The information processing system according to the present exemplary embodiment includes, for example, one or plural terminal apparatuses, one or plural instruments, and one or plural relay apparatuses. In the example illustrated in FIG. 1, the information processing system includes terminal apparatuses 10A and 10B, instruments 12A and 12B, and a relay apparatus 14. Such a number thereof is only an example, and terminal apparatuses, instruments, or relay apparatuses of numbers other than such a number may be included in the information processing system. Hereinafter, in a case where the terminal apparatuses 10A and 10B are not required to be differentiated from each other, the terminal apparatuses will be referred to as a "terminal apparatus 10". Similarly, in a case where the instruments 12A and 12B are not required to be differentiated from each other, the terminal apparatuses will be referred to as an "instrument 12". Each terminal apparatus 10, each instrument 12, and the relay apparatus 14 have a function of performing communication with other apparatuses via a communication path N such as a network. Of course, each terminal apparatus 10, each instrument 12, and the relay apparatus 14 may perform communication with other apparatuses via different communication paths without using the communication path N, and may be perform direct communication with other apparatuses. Other apparatuses such as a server may be included in the information processing system.

The terminal apparatus 10 is an apparatus such as a personal computer (PC), a tablet PC, a smart phone, or a mobile phone, and has a function of performing communication with other apparatuses. The terminal apparatus 10 may be a wearable terminal (for example, a wristwatch type terminal, a wristband type terminal, a spectacle type terminal, a ring type terminal, a contact lens type terminal, an intracorporeal embedded type terminal, and a bearable terminal). The terminal apparatus 10 may have a flexible display as a display device. As the flexible display, for example, an organic electroluminescence type display (flexible organic EL display), an electronic paper type display, or a flexible liquid crystal display is used. Flexible displays employing display methods other than those described may be used. The flexible display is a display of which a display portion is flexibly deformable, and is, for example, a display which can be bent, folded, rolled, twisted, or stretched. The entire terminal apparatus 10 may be configured with the flexible display, and the flexible display and other configurations may be separate from each other functionally or physically.

The instrument 12 is an apparatus having functions, and is, for example, an image forming apparatus having an image forming function (a scanning function, a printing function, a copying function, a facsimile function, and the like), a PC, a tablet PC, a smart phone, a mobile phone, a robot (a humanoid robot, a non-humanoid animal robot, or a robot other than those), a projector, a display apparatus such as a liquid crystal display, a recording apparatus, a reproduction apparatus, an imaging apparatus such as a camera, and an apparatus such as a refrigerator, a rice cooker, a microwave oven, a coffee maker, a cleaner, a washing machine, an air conditioner, a lighting apparatus, a clock, a surveillance camera, an automobile, a motorcycle, an aircraft (for example, an unmanned aircraft (a so-called drone)), a game machine, or various sensing apparatuses (for example, a temperature sensor, a humidity sensor, a voltage sensor, and a current sensor). The instrument 12 may be an apparatus (for example, an image forming apparatus or a PC) which outputs a result to a user, and may be an apparatus (for example, a sensing apparatus) which does not output a result to a user. Among plural apparatuses executing a cooperation function which will be described later, all of the apparatuses may output a result to a user, some of the apparatuses may output a result to a user, the other apparatuses may not output a result to a user, and none of the apparatuses may output a result to a user. General instruments may be included in the conceptual category of the instrument 12. For example, an information instrument, a video instrument, an audio instrument, and other instruments may also be included in the scope of an apparatus according to the present exemplary embodiment. The instrument 12 has a function of performing communication with other apparatuses.

The relay apparatus 14 is an apparatus controlling an operation of each instrument 12. The relay apparatus 14 has a function of performing communication with other apparatuses. The relay apparatus 14 may acquire various pieces of information by using, for example, the Internet. The relay apparatus 14 may function as a server, and may manage data or user information. The relay apparatus 14 may be a so-called smart speaker (an instrument having a wireless communication function and a speaker function), and may be an instrument which has a communication function but does not have a speaker function. The relay apparatus 14 may be provided indoors (for example, on a floor of a room, a ceiling, or a table), and may be provided outdoors. The relay apparatus 14 may be a movable apparatus (for example, a self-running type instrument). The instrument 12 may function as the relay apparatus 14.

Figure 2:
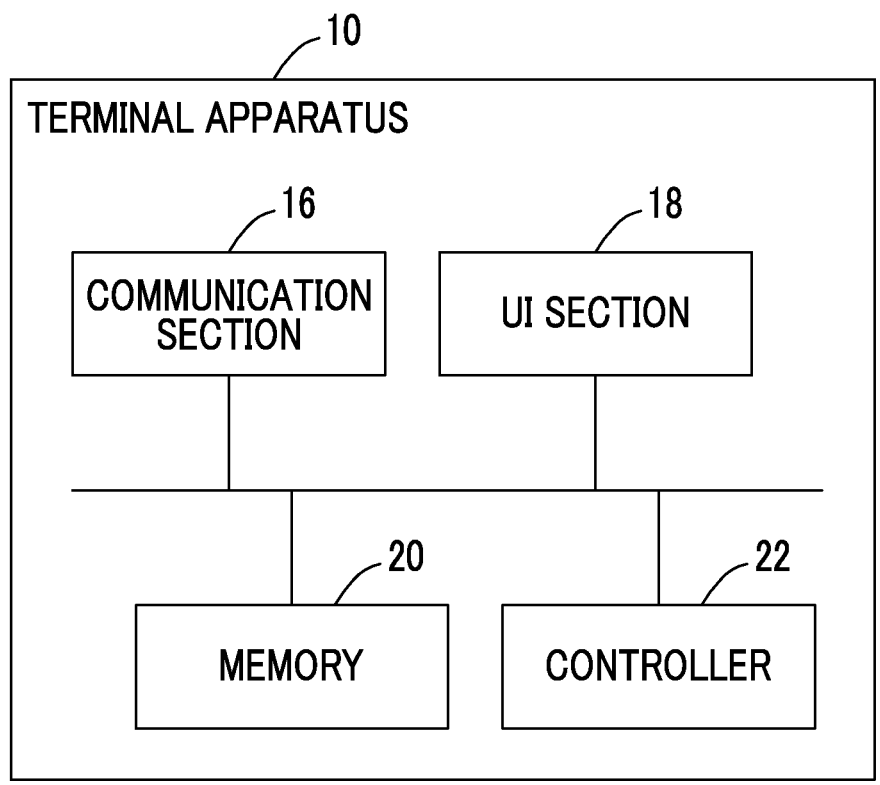
FIG. 2 is a block diagram illustrating a configuration of a terminal apparatus.

Hereinafter, with reference to FIG. 2, a configuration of the terminal apparatus 10 will be described in detail.

A communication section 16 is a communication interface, and has a function of transmitting data to other apparatuses, and a function of receiving data from other apparatuses. The communication section 16 may be a communication interface having a wireless communication function, and may be a communication interface having a wired communication function. The communication section 16 may conform to, for example, a single or plural types of communication methods, and may perform communication with a communication partner according to a communication method suitable for the communication partner (that is, a communication method to which the communication partner conforms). The communication method is, for example, infrared communication, visible light communication, Wi-Fi (registered trademark) communication, or short-range radio communication (for example, Near Field Communication (NFC)). As the short-range radio communication, for example, Felica (registered trademark), Bluetooth (registered trademark), or the Radio Frequency Identifier (RFID) is used. Of course, other types of wireless communication may be used as the short-range radio communication. The communication section 16 may change a communication method or a frequency bandwidth according to a communication partner, and may change a communication method or a frequency bandwidth according to a surrounding environment.

A UI section 18 is a user interface, and includes a display and an operation unit. The display is a display device such as a liquid crystal display. The display may be a flexible display. The operation unit is an input device such as a touch panel or a keyboard. A user interface (including, for example, a touch display or a device in which a keyboard or the like is electronically displayed on a display) which functions as both of a display and an operation unit may be used. The UI section 18 may include a sound collecting unit such as a microphone or a sound generation unit such as a speaker. In this case, information may be input to the terminal apparatus 10 through voice input, and information may be output with a voice.

A memory unit 20 is a storage device such as a hard disk drive or a memory (for example, an SSD). The memory unit 20 stores, for example, various pieces of data, various programs (for example, an operating system (OS) and various application programs (application software)), information (instrument address information) indicating addresses of each instrument 12, and information (relay apparatus address information) indicating an address of the relay apparatus 14. Information regarding a function executed by an instrument may be stored in the memory unit 20. Each piece of data, each piece of information, or each program may be stored in other storage devices, and may be stored in a single storage device.

A control unit 22 has a function of controlling an operation of each unit of the terminal apparatus 10. For example, the control unit 22 performs execution of various programs, control of communication using the communication section 16, control of a notification (for example, information display or voice output) of information using the UI section 18, and reception of information which is input to the terminal apparatus 10 by using the UI section 18.

Hereinafter, with reference to FIG. 3, a configuration of the relay apparatus 14 will be described in detail.

A communication section 24 is a communication interface, and has a function of transmitting data to other apparatuses, and a function of receiving data from other apparatuses. The communication section 24 may be a communication interface having a wireless communication function, and may be a communication interface having a wired communication function. The communication section 24 may conform to, for example, a single or plural types of communication methods, and may perform communication with a communication partner according to a communication method suitable for the communication partner. The communication method is, for example, infrared communication, visible light communication, Wi-Fi communication, or short-range radio communication. The communication section 24 may change a communication method or a frequency bandwidth according to a communication partner, and may change a communication method or a frequency bandwidth according to a surrounding environment.

A memory unit 26 is a storage device such as a hard disk drive or a memory (for example, an SSD). The memory unit 26 stores, for example, a function management information, various pieces of data, various programs (for example, an operating system (OS) and various application programs), information (terminal address information) indicating an address of the terminal apparatus 10, and information (instrument address information) indicating an address of each instrument 12, and information (user identification information) for identifying a user using the relay apparatus 14. These may be stored in other storage devices, and may be stored in a single storage device.

Hereinafter, the function management information will be described in detail. The function management information is information for managing a function which is executable by using a configuration (for example, an instrument as hardware, software, or a target). The target as a configuration is a file (data) or a physical object to which the function is applied. The function may be an independent function, and may be a cooperation function. The independent function is a single function which is executable, for example, by using a single configuration. The cooperation function is a function which is executable by using plural configurations. For example, the cooperation function is a function which is executable by causing plural configurations to cooperate with each other. The cooperation function may be a function which is executable by using plural functions of a single apparatus or a single piece of software. The terminal apparatus 10 or the relay apparatus 14 may also be used as an instrument executing the cooperation function, and a function of the terminal apparatus 10 or the relay apparatus 14 may be used as a part of the cooperation function.

The entire instrument, a specific portion of an instrument, a specific function of software, an aggregate function including plural functions may be used as a configuration. For example, in a case where a function is allocated to each portion of an instrument, the cooperation function may be a function using the portion. In a case where software has plural functions, the cooperation function may be a function using some of the plural functions. The aggregate function is formed of plural functions, and the plural functions are executed simultaneously or sequentially such that a process based on the aggregate function is performed. The cooperation function may be a function using only hardware, may be a function using only software, and may be a function using both of hardware and software.

The function management information is, for example, information indicating a correlation between a configuration (configuration identification information for identifying each configuration) used for a function and function information regarding the function. For example, an independent configuration used to execute an independent function and function information regarding the independent function are correlated with each other, and are registered in the function management information. A combination (a combination of pieces of configuration identification information for identifying respective configurations) of plural configurations used to execute a cooperation function and function information regarding the cooperation function are correlated with each other, and are registered in the function management information.

In a case where a configuration is an instrument, configuration identification information is information (instrument identification information) for identifying the instrument. In a case where a configuration is software, configuration identification information is information (software identification information) for identifying the software. In a case where a configuration is a target, configuration identification information is information (target identification information) for identifying the target. The configuration identification information for identifying an instrument may include information indicating a function of the instrument. Similarly, the configuration identification information for identifying software may include information indicating a function of the software.

The instrument identification information is, for example, information indicating the name of the instrument, an instrument ID, or the type of instrument, a model number of the instrument, information (for example, asset management information) for managing the instrument, information (instrument position information) indicating a position where the instrument is provided, an image (instrument image) associated with the instrument, or instrument address information. The instrument image is, for example, an appearance image representing the instrument. The appearance image may be an image representing an outside (for example, a casing of the instrument) of the instrument, may be an image representing a state (for example, an internal state) in which a casing is opened, and the inside thereof is viewed from the outside, or an image representing a state in which the instrument is covered with a packaging sheet. The instrument image is an image (an image representing an appearance of the instrument or an image representing the inside thereof) generated by imaging the instrument with an imaging device such as a camera, and may be an image (for example, an icon) schematically representing the instrument. The instrument image may be a still image, and may be a moving image. Data of the instrument image may be stored in the memory unit 26, and may be stored in other apparatuses such as the terminal apparatus 10 or the instrument 12.

The software identification information is, for example, information indicating the name of the software, a software ID, or the type of software, a model number of the software, information for managing the software, an image (software image) associated with the software. The software image is, for example, an image (for example, an icon) representing a function of the software. The software image may be a still image, and may be a moving image. Data of the software image may be stored in the memory unit 20, and may be stored in other apparatuses such as the terminal apparatus 10 or the instrument 12.

The target identification information is, for example, information indicating the name of the target, a target ID, or the type of target, or an image (target image) associated with the target. For example, in a case where the target is a file (data), the name or the like of the file (for example, an image file or a document file) is used as target identification information. In a case where the target is a physical object (for example, a commodity), the name or the like of the object is used as target identification information. The target image is an image (a still image or a moving image) generated by imaging a physical target with an imaging device such as a camera, and may be an image (for example, an icon) schematically representing the target. Data of the target image may be stored in the memory unit 26, and may be stored in other apparatuses such as the terminal apparatus 10 or the instrument 12.

The function information includes, for example, identification information such as the name or an ID of a function, and content information indicating a content of the function. The function information regarding an independent function includes identification information of the independent function and content information indicating a content of the independent function. The function information regarding a cooperation function includes identification information of the cooperation function and content information indicating a content of the cooperation function.

The cooperation function may be a function which is executable by causing different plural configurations to cooperate with each other, and may be a function which is executable by causing identical configurations to cooperate with each other. The cooperation function may be a function which cannot be used before cooperation. For example, an instrument (printer) having a printing function and an instrument (scanner) having a scanning function are caused to cooperate with each other, and thus a copying function is executable as the cooperation function. In other words, the copying function is executable by causing the printing function and the scanning function to cooperate with each other. In this case, the copying function as the cooperation function is correlated with a combination of the printing function and the scanning function.

The conceptual category of the cooperation function may include a combined function in which a new function is executable by causing plural instruments or plural pieces of software to cooperate with each other. For example, an extended display function as the combined function may be realized by combining plural displays with each other. As another example, a recording function as the combined function may be realized by combining a television set with a recorder. The recording function may be a function of recording images displayed on the television set. An imaging region extending function as the combined function may be realized by combining plural cameras with each other. The extending function is, for example, a function in which imaging is performed by connecting imaging regions of the respective cameras to each other. A translation call function (a function in which a conversation is translated via a telephone) as the combined function may be realized by combining a telephone with a translator or translation software. As mentioned above, the conceptual category of the cooperation function may include a function which is realizable by causing plural instruments or plural pieces of software of an identical type to cooperate with each other, or a function which is realizable by causing plural instruments or plural pieces of software of different types to cooperate with each other.

The control unit 28 has a function of controlling an operation of each unit of the relay apparatus 14. For example, the control unit 28 executes various programs, and controls communication using the communication section 24. The control unit 28 has a function of controlling a configuration such as the instrument 12 according to a content set in the function management information. The control unit 28 includes a setting unit 30 and a warning processing unit 32.

The setting unit 30 has a function of setting a function (an independent function or a cooperation function) in a configuration. The setting unit 30 registers configuration identification information for identifying the configuration and function information regarding the function in the function management information in correlation with each other. For example, in a case where a user gives an instruction for setting a function in a configuration by using the terminal apparatus 10, information indicating the setting instruction is transmitted from the terminal apparatus 10 to the relay apparatus 14. The setting unit 30 sets the function in the configuration in response to the setting instruction. The setting unit 30 may manage each function set in a configuration for each user.

In a case where an instruction for setting a function in a configuration is given (for example, in a case where the setting unit 30 receives the setting instruction), the warning processing unit 32 has a function of performing a warning process in a case where another functions is already set in the configuration. For example, in a case where the function and another function are functions for executing processes contradictory to each other by using the configuration, the warning processing unit 32 performs a warning process. The warning processing unit 32 creates, for example, warning information indicating that contradictory processes are performed, and transmits the warning information to the terminal apparatus 10 which has given the function setting instruction. The warning information is displayed on the terminal apparatus 10. The warning information may be emitted from the terminal apparatus 10, the relay apparatus 14, or other speakers, as voices.

The relay apparatus 14 may include a UI section. In this case, the control unit 28 controls a notification (for example, information display or voice output) of information using the UI section, and receives information which is input to the relay apparatus 14 by using the UI unit.

The setting unit 30 and the warning processing unit 32 may be provided in the terminal apparatus 10, and processes in the setting unit 30 and the warning processing unit 32 may be performed by the terminal apparatus 10. For example, the terminal apparatus 10 may set a function in the instrument 12 by performing direct communication with the instrument 12 without using the relay apparatus 14. Of course, the terminal apparatus 10 may set a function in the instrument 12 by performing communication with the instrument 12 via an apparatus such as the relay apparatus 14 or a server. The function management information may be stored in the memory unit 20 of the terminal apparatus 10. The setting unit 30 and the warning processing unit 32 may be provided in the instrument 12, and instrument management information may be stored in the instrument 12.

In the present exemplary embodiment, the terminal apparatus 10 may function as an information processing apparatus, and the relay apparatus 14 may function as an information processing apparatus. Of course, the instrument 12 may function as an information processing apparatus.

Hereinafter, the information processing system according to the present exemplary embodiment will be described in more detail.

With reference to FIG. 4, the function management information will be described in detail. FIG. 4 illustrates an example of a function management table as the function management information. In the function management table, as an example, a user ID, a function ID, information indicating a configuration (an instrument, software, or a target), and information indicating a content of a function (an independent function or a cooperation function) are correlated with each other. The user ID is an example of user identification information. For example, user account information (for example, user account information used to set or execute a function) for using a service provided by the relay apparatus 14 is used as the user ID. The whole or a part of an instrument may be used as a configuration. A specific function of software may be used as a configuration. The configuration is specified by level information of a subordinate concept (for example, a proper name (for example, a specific product name, a commodity name, a model number, a web site name, or a URL) of the configuration). Of course, the configuration may be specified by level information of a generic concept (for example, a common name or a general name of the configuration). Hereinafter, each function will be described in detail.

For example, a user A is correlated with functions 1 and 2. In other words, the user A gives a setting instruction for the functions 1 and 2, and the functions 1 and 2 are set in a configuration, and are registered in the function management table.

The function 1 is a cooperation function which is executable through cooperation between an opening/closing sensor A as an instrument and a lighting apparatus B as an instrument. The opening/closing sensor A is a sensor detecting opening and closing of a door. A content of the function 1 is that "the lighting apparatus B is lighted in a case where the opening/closing sensor A detects opening of the door". Specifically, in a case where the opening/closing sensor A detects opening of the door, information indicating the detection result is transmitted to the relay apparatus 14 from the opening/closing sensor A. In a case where the information indicating the detection result is received, the control unit 28 of the relay apparatus 14 transmits information indicating a lighting instruction to the lighting apparatus B, so as to light the lighting apparatus B. For example, instrument address information of each of the opening/closing sensor A and the lighting apparatus B is stored in the memory unit 26 of the relay apparatus 14, and the control unit 28 of the relay apparatus 14 performs transmission and reception of information by using the instrument address information. Of course, the terminal apparatus 10 associated with the user A may perform such control by using the relay apparatus 14 or without using the relay apparatus 14. The opening/closing sensor A and the lighting apparatus B may perform direct communication with each other without using the relay apparatus 14, so as to perform the operation.

The function 2 is a cooperation function which is executable through cooperation among a scanner C as an instrument, optical character recognition (OCR) software D and business form creation software E, and a receipt and an accounting file F which are targets to which the function 2 is applied. A content of the function 2 is that "in a case where the receipt is scanned with the scanner C, a content of the receipt generated according to thereto is added to the accounting file F".

Specifically, an image is generated by reading the receipt with the scanner C, text is extracted from the image by the OCR software D, and the text is added to the accounting file F by the business form creation software E. More specifically, in a case where the imaging is generated, data of the image is transmitted to the relay apparatus 14 from the scanner C. The relay apparatus 14 controls a process using the OCR software D and a process using the business form creation software E. The relay apparatus 14 transmits the data of the image to an apparatus (for example, a server, the terminal apparatus 10, or the instrument 12) in which the OCR software D and the business form creation software E are installed, and causes the apparatus to perform processes using the OCR software D and the business form creation software E. The apparatus acquires the accounting file F from a storage location thereof (for example, the server or the terminal apparatus 10), and performs the processes using the OCR software D and the business form creation software E. Of course, in a case where the OCR software D and the business form creation software E are installed in the relay apparatus 14, the relay apparatus 14 may perform the processes using the OCR software D and the business form creation software E. The process using the OCR software D and the process using the business form creation software E may be performed by different apparatuses. In the same manner as in the function 1, the terminal apparatus 10 or the scanner C associated with the user A may perform the control.

A user B is correlated with functions 3 and 4. In other words, the user B gives a setting instruction for the functions 3 and 4, and the functions 3 and 4 are set in a configuration, and are registered in the function management table.

The function 3 is a cooperation function which is executable through cooperation among a web browser G as software, a shopping site H on the Internet and a purchase instruction, and a brand bag J which is a target. A content of the function 3 is that "the web browser G is activated, and, in a case where the brand bag J is exhibited in the shopping site H, the brand bag J is purchased". For example, in a case where the web browser G is installed in the relay apparatus 14, the function 3 is executed by the relay apparatus 14. In a case where the web browser G is installed in the terminal apparatus 10 associated with the user B, the function 3 may be executed by the terminal apparatus 10. The web browser G monitors the shopping site H, and performs a purchase process for the brand bag J in a case where the brand bag J is exhibited in the shopping site.

The function 4 is a cooperation function which is executable through cooperation between presentation software K, and an image and a presentation file which are targets. A content of the function 4 is that "in a case where the image and the presentation file are selected by the user, the image is added to the presentation file by the presentation software K".

For example, in a case where the presentation software K is installed in the relay apparatus 14, the function 4 is executed by the relay apparatus 14. For example, in a case where the user B selects the image and the presentation file by using the terminal apparatus 10 associated with the user B, and gives an instruction for transmitting the image and the presentation file to the relay apparatus 14, data of the image and the presentation file are transmitted to the relay apparatus 14 from the terminal apparatus 10 associated with the user B, and the function 4 is executed by the relay apparatus 14. In a case where the presentation software K is installed in the terminal apparatus 10 associated with the user B, the function 4 may be executed by the terminal apparatus 10.

A user C is correlated with functions 5 and 6. In other words, the user C gives a setting instruction for the functions 5 and 6, and the functions 5 and 6 are set in a configuration, and are registered in the function management table.

The function 5 is a cooperation function which is executable through cooperation between document creation software L and business form creation software M, and a document file and an accounting file which are targets. A content of the function 5 is that "in a case where the document file and the accounting file are selected by the user, a content of the document file is added to the accounting file by the document creation software L and the business form creation software M".

For example, in a case where the document creation software L and the business form creation software M are installed in the relay apparatus 14, the function 5 is executed by the relay apparatus 14. For example, in a case where the user c selects the document file and accounting file by using the terminal apparatus 10 associated with the user C, and gives an instruction for transmitting the files to the relay apparatus 14, data of the document file and the accounting file are transmitted to the relay apparatus 14 from the terminal apparatus 10 associated with the user C, and the function 5 is executed by the relay apparatus 14. In a case where the document creation software L and the business form creation software M are installed in the terminal apparatus 10 associated with the user C, the function 5 may be executed by the terminal apparatus 10.

The function 6 is a cooperation function which is executable through cooperation between a telephone N as an instrument and document creation software P. A content of the function 6 is that "contents of conversations using the telephone N is preserved as a document by the document creation software P". Specifically, information indicating contents of conversations using the telephone N is transmitted to the relay apparatus 14 from the telephone N. In a case where the document creation software P is installed in the relay apparatus 14, the function 6 is executed by the relay apparatus 14. In a case where the document creation software P is installed in the terminal apparatus 10 associated with the user C, information indicating contents of conversations may be transmitted to the terminal apparatus 10 from the relay apparatus 14, and the function 6 may be executed by the terminal apparatus 10. Of course, the terminal apparatus 10 or the telephone N associated with the user C may perform the control without using the relay apparatus 14.

A user D is correlated with a function 7. In other words, the user D gives a setting instruction for the function 7, and the function 7 is set in a configuration, and is registered in the function management table.

The function 7 is a cooperation function which is executable through cooperation between the opening/closing sensor A and a security camera Q as instruments, and notification software R. A content of the function 7 is that "in a case where the opening/closing sensor A detects opening of the door, the security camera Q performs imaging, and the notification software R notifies the user D of the detection result".

Specifically, in a case where the opening/closing sensor A detects opening of the door, information indicating the detection result is transmitted to the relay apparatus 14 from the opening/closing sensor A. In a case where the information indicating the detection result is received, the control unit 28 of the relay apparatus 14 transmits information indicating an imaging instruction to the security camera Q. The security camera Q performs imaging in response to the imaging instruction. Image data (for example, still image data or a moving image data) obtained through the imaging is transmitted from the security camera Q to the terminal apparatus 10 associated with the user D via the relay apparatus 14 by the notification software R. Of course, the terminal apparatus 10 associated with the user D may perform such control without using the relay apparatus 14.

The functions illustrated in FIG. 4 are only examples, and other functions (an independent function or a cooperation function) may be registered in the function management table. For example, a cooperation function may be a function which is executable by using an Internet of Things (IoT) instrument. A cooperation function may be used in a connected home (a system in which instruments such as home appliances are connected to each other via a network by using an IoT technology). In this case, the instruments may be connected to each other by using a specific server, and may be connected to each other without using the specific server.

Plural configurations may be caused to cooperate with each other via IFTTT so as to execute a cooperation function. In other words, a content of a cooperation function may be that, in a case where an event serving as a trigger occurs in any configuration, another configuration performs an action (process). For example, the function 1 is a function in which detection of opening of the door in the opening/closing sensor A serves as a trigger, and an action of lighting the lighting apparatus B is performed. The function 3 is a function in which exhibition of the brand bag J serves as a trigger, and an action of purchasing the brand bag J is performed. A function in which an action performed by any configuration serves as a trigger, and still another configuration performs an action may be included in the category of a cooperation function according to the present exemplary embodiment. A function of causing plural web services to cooperate with each other or API cooperation in which plural systems or services are caused to cooperate with each other by using the Application Programming Interface (API) may be included in the category of a cooperation function according to the present exemplary embodiment.

An instrument executing a set function may be controlled by the relay apparatus 14, and may be controlled by the terminal apparatus 10 (for example, the terminal apparatus 10 associated with a user setting the function). In a case where the instrument is controlled by the relay apparatus 14, the relay apparatus 14 transmits a control signal for controlling an operation of the instrument to the instrument so as to control the instrument. In a case where the instrument is controlled by the terminal apparatus 10, the terminal apparatus 10 directly transmits the control signal to the instrument or transmits the control signal to the instrument via the relay apparatus 14, so as to control the instrument. The relay apparatus 14 may transmit a control signal to another relay apparatus, and another relay apparatus may control the instrument. The relay apparatus 14 may transmit a control signal to a server, and the server may control the instrument.

Software executing a set function may be installed in the relay apparatus 14, may be installed in the terminal apparatus 10 (for example, the terminal apparatus 10 associated with a user setting the function), and may be installed in other apparatuses such as a server.

A file which is a target of a set function may be stored in the relay apparatus 14, may be stored in the terminal apparatus 10 (for example, the terminal apparatus 10 associated with a user setting the function), and may be stored in other apparatuses such as a server.

As an instrument, a portion of the instrument may be used. For example, in a case where an instrument has plural functions, and a function is allocated to each portion of the instrument, a cooperation function which is executable by using the portion of the instrument may be defined. Specifically, for example, it is assumed that a printing function is allocated to a main body portion of a multi-function peripheral, a scanning function is allocated to a reading portion (for example, a portion corresponding to a document cover, a document glass, or an automatic document feeder) of the multi-function peripheral, and a postprocessing function (for example, a stapling function) is allocated to a postprocessing device of the multi-function peripheral. In a case where the scanning function is used in the function 2, the reading portion of the multi-function peripheral may be set as a configuration required for the function 2. As software, an aggregate function which is determined in the block unit, such as Robotics Process Automation (RPA), may be used.

For example, function setting software for setting a function in a configuration is installed in the terminal apparatus 10, and is stored in the memory unit 20. In a case where a user gives an execution instruction for the function setting software by using the UI section 18, the control unit 22 of the terminal apparatus 10 executes the function setting software. Consequently, a function setting screen (for example, a screen for setting a cooperation function) is displayed on the UI section 18. The user designates a configuration (an instrument, software, or a target) and a function executed by the configuration on the function setting screen. Information indicating the configuration and the function designated by the user is transmitted from the terminal apparatus 10 to the relay apparatus 14. The setting unit 30 of the relay apparatus 14 sets the function designated by the user in the configuration designated by the user, and registers the configuration and the function in the function management table in correlation with each other.

For example, information indicating an independent function which is executable by using a configuration and information indicating a cooperation function which is executable by using one or plural configurations are created in advance, and the information is stored in the terminal apparatus 10, the relay apparatus 14, or a server. For example, information indicating a function of the instrument 12 (that is, an independent function which is executable by the instrument 12) and information indicating a function of software (that is, an independent function which is executable by the software) are created in advance, and the information is stored in the terminal apparatus 10, the relay apparatus 14, or a server. Information indicating a cooperation function which is executable by using a single or plural instruments 12, information indicating a cooperation function which is executable by using a single piece of plural pieces of software, and information indicating a cooperation function which is executable by using a single or plural instruments 12 and a single piece of plural pieces of software are created in advance, and the information is stored in the terminal apparatus 10, the relay apparatus 14, or a server. A cooperation function which is executable by using a single or plural targets and other configurations (one or plural instruments 12 or one piece or plural pieces of software) is created in advance, and the information is stored in the terminal apparatus 10, the relay apparatus 14, or a server. The setting unit 30 of the relay apparatus 14 determines whether or not a function (an independent function or a cooperation function) designated by the user is executable by a single or plural configurations designated by the user by referring to the information. In a case where the execution is possible, the setting unit 30 sets the function (an independent function or a cooperation function) designated by the user in the single or plural configurations designated by the user, and registers the single or plural configurations and the function in the function management table in correlation with each other. In a case where the execution is not possible, the setting unit 30 does not register the function designated by the user in the function management table.

The control unit 28 of the relay apparatus 14 refers to the function management table, and controls execution of a function registered in the function management table. The control is as described above. As described above, the control may be performed by the terminal apparatus 10, the instrument 12, or a server.

Hereinafter, a specific example of a process performed by the information processing system according to the present exemplary embodiment will be described.

Figure 5:
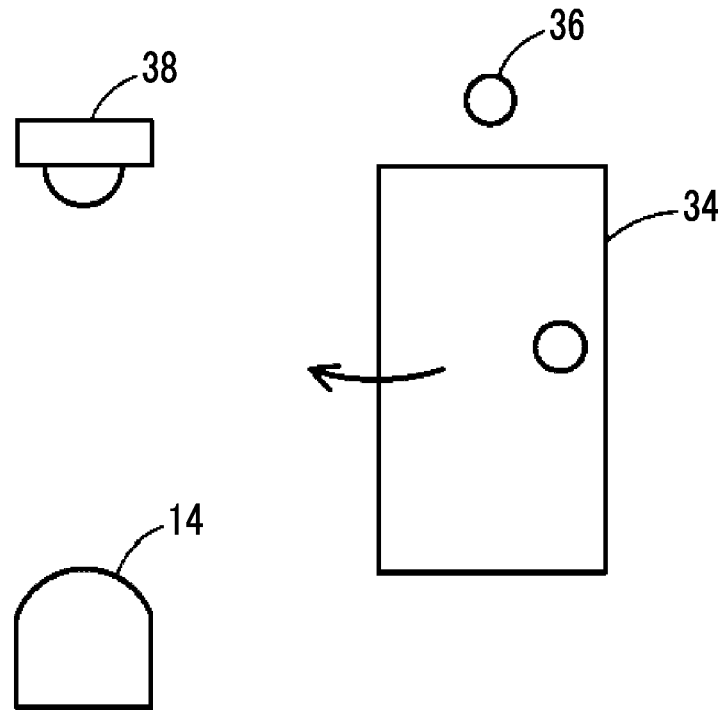
FIG. 5 is a diagram illustrating an instrument used to execute a cooperation function.

FIG. 5 illustrates an instrument used for a cooperation function. For example, an opening/closing sensor 36 detecting opening and closing of a door 34 is provided near the door 34. A lighting apparatus 38 is provided. It is assumed that a cooperation function in which "the lighting apparatus 38 is lighted in a case where opening of the door 34 is detected by the opening/closing sensor 36" is set by the user A in advance. The cooperation function is registered as the function 1 associated with the user A in the function management table illustrated in FIG. 4.

Hereinafter, a description will be made of a process in a case where another user B tries to set a cooperation function in which "the lighting apparatus 38 is unlighted in a case where opening of the door 34 is detected by the opening/closing sensor 36" in a state in which the function 1 is already set.

Figure 6:
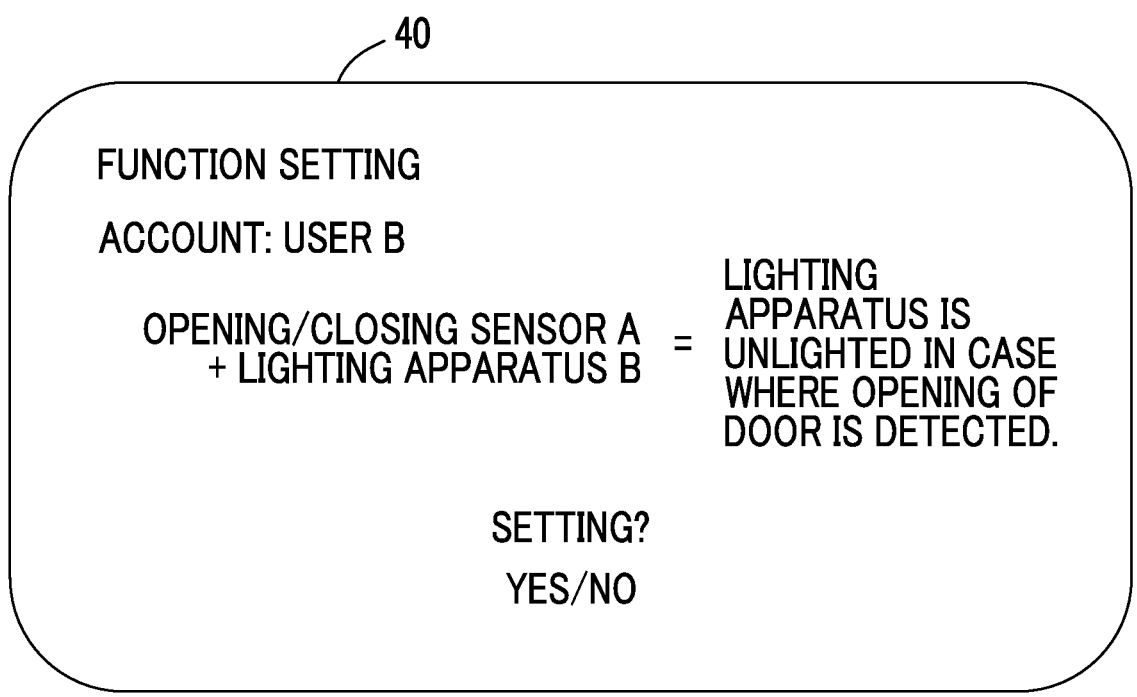
FIG. 6 is a diagram illustrating a screen.

FIG. 6 illustrates an example of a function setting screen. For example, in a case where the user B gives an execution instruction for the function setting software by using the UI section 18 of the terminal apparatus 10, the control unit 22 of the terminal apparatus 10 executes the function setting software. Consequently, a function setting screen 40 is displayed on the UI section 18. The function setting screen 40 is a screen for setting a function (an independent function or a cooperation function). The user designates a single or plural configurations, and a function executed by the single or plural configurations on the function setting screen 40. In the example illustrated in FIG. 6, the opening/closing sensor A and the lighting apparatus B are designated as instruments corresponding to configurations, and a function in which "the lighting apparatus is unlighted in a case where opening of the door is detected" is designated as a cooperation function executed by using the instruments. Herein, a cooperation function is designated, but an independent function may be designated.

The control unit 22 of the terminal apparatus 10 may display a list of an instrument group included in the information processing system on the function setting screen 40 according to a pull-down method, and the user B may select an instrument used for the cooperation function from the list. The user B may directly input information indicating an instrument used for the cooperation function to the function setting screen 40. Similarly, the control unit 22 may display a list of a software group on the function setting screen 40 according to a pull-down method, and the user B may select software used for the cooperation function from the list. The user B may directly input information indicating software used for the cooperation function to the function setting screen 40. The software group includes, for example, software installed in the terminal apparatus 10 associated with the user B, software installed in the relay apparatus 14, software installed in each instrument 12, and software installed in other apparatuses such as a server. The control unit 22 may display a list of a target group (for example, a file group or a commodity group) on the function setting screen 40 according to a pull-down method, and the user B may select a target (for example, a file or a commodity) to which the cooperation function is applied from the list. The user B may directly input information indicating a target to which the cooperation function is applied to the function setting screen 40.

In a case where plural instruments used for the cooperation function are designated by the user B, the control unit 22 may display a list of a cooperation function group which is executable by using the plural instruments on the function setting screen 40 according to a pull-down method. In this case, the user B may select a cooperation function from the list. In the example illustrated in FIG. 6, in a case where the opening/closing sensor A above-described the lighting apparatus B are designated by the user B, a list of cooperation functions which is executable by using the opening/closing sensor and the lighting apparatus is displayed on the function setting screen 40. As described above, information indicating a cooperation function which is executable by using a single or plural configurations is created in advance, and is stored in the terminal apparatus 10, the relay apparatus 14, or other apparatuses. The control unit 22 retrieves a list of cooperation functions which is executable by using the opening/closing sensor and the lighting apparatus by referring to the information, and displays the list on the function setting screen 40. Of course, the user B may directly input information indicating a cooperation function to the function setting screen 40.

In a case where the user B gives a function setting instruction on the function setting screen 40 (for example, in a case where a "Yes" button is pressed), the terminal apparatus 10 transmits function setting instruction information to the relay apparatus 14. The setting instruction information includes user identification information (for example, user account information) of the user B, information indicating a configuration designated by the user B, and information indicating a function designated by the user B. In the example illustrated in FIG. 6, as information indicating a configuration and a function, information indicating the opening/closing sensor A and the lighting apparatus B and information indicating the cooperation function with the content that "the lighting apparatus is unlighted in a case where opening of the door is detected" are included in the setting instruction information, and are transmitted from the terminal apparatus 10 to the relay apparatus 14.

The setting unit 30 of the relay apparatus 14 receives the setting instruction information. The warning processing unit 32 of the relay apparatus 14 refers to the function management table illustrated in FIG. 4 before setting of the function based on the setting instruction information is completed (for example, before the function is registered in the function management table), and determines whether or not another function is already set in the configuration indicated by the setting instruction information. In a case where another function is already set in the configuration, the warning processing unit 32 determines whether or not the function indicated by the setting instruction information and another function are functions for executing processes contradictory to each other by using the configuration.

A cooperation function executed by using the opening/closing sensor A and the lighting apparatus B is already set as the function 1 by the user A, and the function 1 is a function contradictory to the cooperation function which is to be newly set by the user B. Specifically, whereas the function 1 is a cooperation function in which "the lighting apparatus B is lighted in a case where opening of the door is detected by the opening/closing sensor A", the function to be set by the user B is a cooperation function in which "the lighting apparatus B is unlighted in a case where opening of the door is detected by the opening/closing sensor A". In other words, a trigger condition (execution condition) for executing the function 1 and a trigger condition for executing the function which is to be set by the user B are the same as each other, and both of the functions perform processes contradictory to each other under the identical trigger condition. In this case, the warning processing unit 32 creates warning information indicating that contradictory processes are performed, and transmits the warning information to the terminal apparatus 10 associated with the user B. The warning information is displayed on the UI section 18 of the terminal apparatus 10. The warning information may be emitted as voices.

FIG. 7 illustrates an example of warning information. A screen 42 is displayed on the UI section 18 of the terminal apparatus 10 associated with the user B, and the control unit 22 of the terminal apparatus 10 displays warning information on the screen 42. For example, a message indicating that contradictory operations occur under the identical trigger condition (a condition that opening of the door is detected) is displayed on the screen 42 as the warning information. As mentioned above, the warning information is displayed before setting of a function contradictory to the function 1 is completed.

As mentioned above, according to the present exemplary embodiment, in a case where a function contradictory to another function is to be newly set in a configuration in which another function is already set, a user is notified of a warning. In the above-described way, the user can recognize a problem which may occur in a case where plural functions are set in the configuration before setting of the function is completed.

In the above example, a cooperation function is set in plural instruments as configurations, but software or a target (a file or a commodity) may be designated as a configuration, and an independent function may be set in a configuration.

Hereinafter, modification examples will be described.

Modification Example 1

In Modification Example 1, in a case where another function contradictory to a function indicated by setting instruction information is already set in an identical configuration, the setting unit 30 of the relay apparatus 14 cancels setting of another function which is already set, and sets the function indicated by the setting instruction information in the configuration. In other words, the setting unit 30 overwrites the function on the configuration. Consequently, another function which is already set is not executed, and the function which is set later is executed.

In the above example, the setting unit 30 cancels the function 1 which is already set in the opening/closing sensor A and the lighting apparatus B, and sets the cooperation function (a function in which "the lighting apparatus B is unlighted in a case where opening of the door is detected") designated by the user B in the opening/closing sensor A and the lighting apparatus B. In this case, the setting unit 30 registers the cooperation function designated by the user B in the function management table. The setting unit 30 deletes the function 1 from the function management table, or associates information (a flag or the like) indicating the function of which execution is prohibited with the function 1 in the function management table. In the above-described way, the function 1 is not executed, and the cooperation function set by the user B is executed by the opening/closing sensor A and the lighting apparatus B.

For example, in a case where the user B presses the "Yes" button on the function setting screen 40 illustrated in FIG. 6, the control unit 22 of the terminal apparatus 10 associated with the user B displays a screen for giving an instruction for a function overwrite setting on the UI section 18. FIG. 8 illustrates a screen 44 in this case. A message asking the user whether or not the function overwrite setting is performed is displayed on the screen 44. In a case where the user presses a "Yes" button on the screen 44, the terminal apparatus 10 transmits information indicating an overwriting instruction to the relay apparatus 14. In a case where the overwriting instruction is received, the setting unit 30 of the relay apparatus 14 overwrites the cooperation function designated by the user B on the opening/closing sensor A and the lighting apparatus B.

Figure 9:
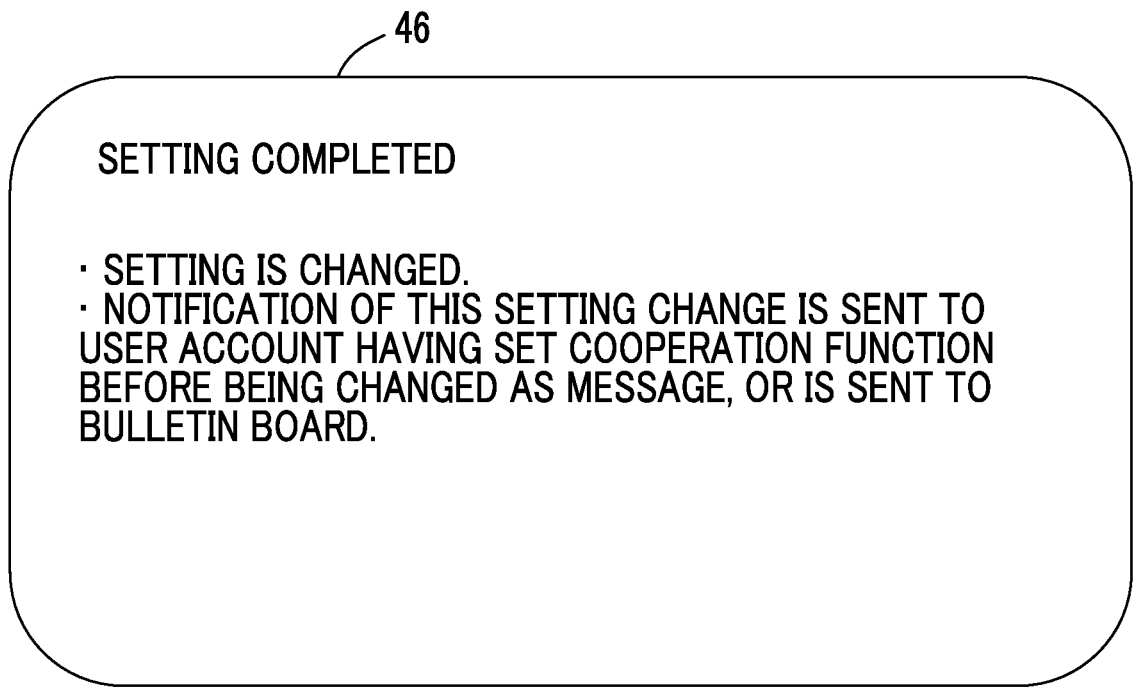
FIG. 9 is a diagram illustrating a screen.

The control unit 22 of the terminal apparatus 10 associated with the user B displays a screen for a notification of completion of overwriting on the UI section 18. FIG. 9 illustrates a screen 46 in this case. A message indicating that overwriting is completed is displayed on the screen 46.

According to Modification Example 1, even in a case where another function is already set in a configuration, a function which is set later is executable.

The control unit 28 of the relay apparatus 14 transmits information indicating that the function 1 is canceled through overwriting, to the terminal apparatus 10 associated with the user A having set the canceled function 1. For example, terminal address information of the terminal apparatus 10 associated with the user A is stored in the memory unit 26 of the relay apparatus 14, and the control unit 28 transmits information indicating that the function 1 is canceled through overwriting, to the terminal apparatus 10 associated with the user A having set the canceled function 1 by using the terminal address information. The information is displayed on the UI section 18 of the terminal apparatus 10 associated with the user A. In the above-described way, the user having set the canceled function can recognize that the function set by the user is canceled. The information may be displayed on a bulletin board of a service (application) provided by the relay apparatus 14.

The control unit 28 of the relay apparatus 14 may notify the terminal apparatus 10 associated with a user (for example, a manager) having a predefined authority of information indicating that a function is canceled through overwriting.

In a case where a user having a cancellation authority gives an instruction for an overwrite setting (that is, an instruction for canceling a function which is already set and an instruction for setting a new function), the setting unit 30 of the relay apparatus 14 may perform a function overwrite setting. For example, user identification information (for example, user account information) of a user having a cancellation authority is stored in the memory unit 26 of the relay apparatus 14. The setting unit 30 performs the function overwrite setting in a case where user identification information of a user giving an instruction for an overwrite setting is stored in the memory unit 26 as user identification information of a user having a cancellation authority, and does not perform the function overwrite setting in other cases. In the above example, in a case where user identification information of the user B is stored in the memory unit 26 as user identification information of a user having a cancellation authority, the setting unit 30 performs the function overwrite setting.

Modification Example 2

In Modification Example 2, even in a case where another function contradictory to a function indicated by setting instruction information is already set in an identical configuration, the setting unit 30 of the relay apparatus 14 sets the function in the configuration.

In the above example, even in a case where the function 1 is set in the opening/closing sensor A and the lighting apparatus B, the setting unit 30 sets the cooperation function designated by the user B in the opening/closing sensor A and the lighting apparatus B. In other words, the setting unit 30 newly registers the cooperation function designated by the user B in the function management table. Consequently, both of the function 1 and the cooperation function which is designated by the user B and is contradictory to the function 1 are registered in the function management table.

In a case where a trigger condition occurs, in other words, in a case where opening of the door is detected by the opening/closing sensor A, the control unit 28 of the relay apparatus 14 executes either the function 1 or the cooperation function designated by the user B. The control unit 28 may execute the function 1 which is set earlier, and may execute the cooperation function set later by the user B.

Figure 10:
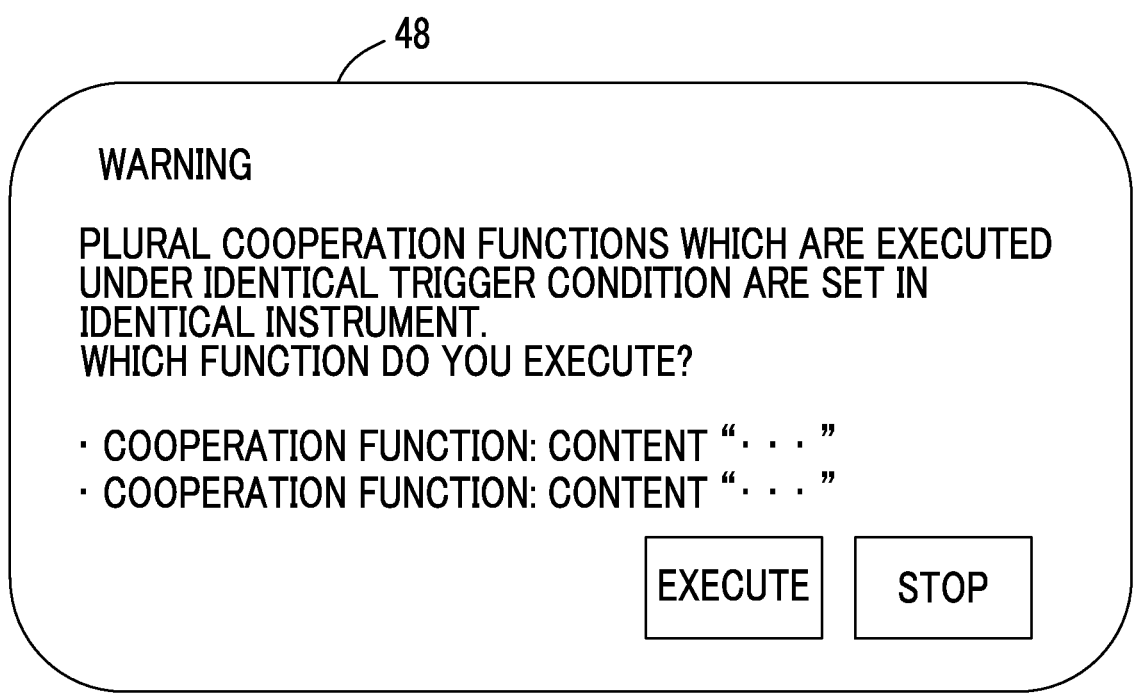
FIG. 10 is a diagram illustrating a screen.

The control unit 28 may inquire of a user about an execution target function at the time when a trigger condition occurs or when the cooperation function designated by the user B is registered. The control unit 28 transmits information indicating the inquiry to the terminal apparatus 10 associated with the user A who has set the function 1 earlier or the terminal apparatus 10 associated with the user B who has set the cooperation function later. Of course, the control unit 28 may transmit the information indicating the inquiry to the terminal apparatus 10 associated with the user A and the terminal apparatus 10 associated with the user B. For example, a screen 48 illustrated in FIG. 10 is displayed on the UI section 18 of the terminal apparatus 10 receiving the information. Information the screen 48 is information included in the information indicating the inquiry. Information indicating plural cooperation functions contradictory to each other, set in an identical instrument, is displayed on the screen 48. In the above example, information indicating the function 1 set by the user A and information indicating the cooperation function set by the user B are displayed on the screen 48.

In a case where the user A or the user B selects the function and presses an execution button on the screen 48, the control unit 28 of the relay apparatus 14 identifies the selected function as an execution target function, and executes the selected function in a case where a trigger condition occurs. For example, the control unit 28 identifies a function selected earlier on the screen 48 as an execution target function, and executes the function selected earlier in a case where a trigger condition occurs.

Modification Example 3

In Modification Example 3, a period (hereinafter, referred to as an "execution period") in which a function is executed is set as a function execution condition, and the function is executed during the execution period. In a case where plural functions contradictory to each other are set in an identical configuration, and execution periods of the respective functions at least partially overlap each other, the warning processing unit 32 of the relay apparatus 14 performs a warning process. An execution period is designated by, for example, a date, the date and time, a time point, or a day of the week.

Figure 11:
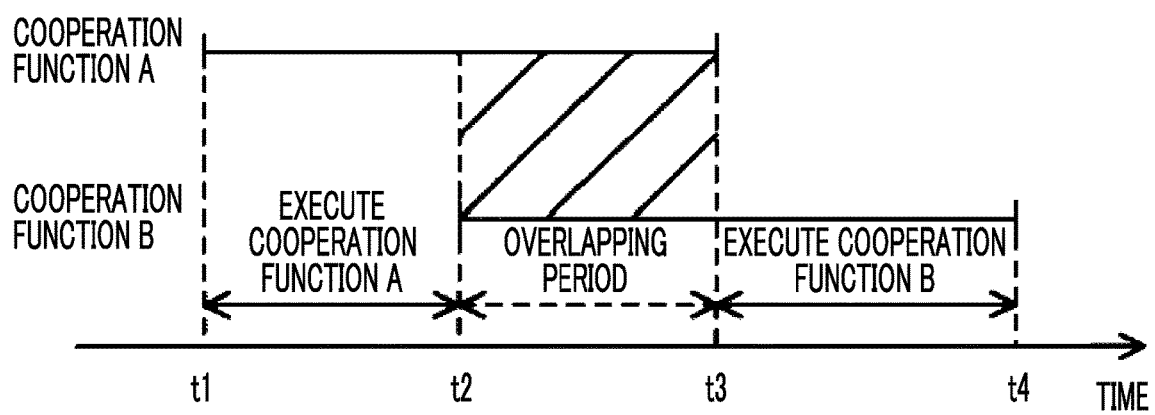
FIG. 11 is a diagram illustrating a cooperation function execution period.

Hereinafter, with reference to FIG. 11, Modification Example 3 will be described in detail. FIG. 11 illustrates examples of execution periods of cooperation functions A and B. The cooperation functions A and B are cooperation functions set in an identical configuration, and are functions contradictory to each other. For example, it is assumed that the opening/closing sensor A and the lighting apparatus B are used as configurations. It is assumed that the cooperation function A is a function in which "the lighting apparatus B is lighted in a case where opening of the door is detected by the opening/closing sensor A" in the same manner as the function 1, and the cooperation function B is contradictory thereto and is a function in which "the lighting apparatus B is unlighted in a case where opening of the door is detected by the opening/closing sensor A".

An execution period of the cooperation function A is a period from a time point t1 to a time point t3, and an execution period of the cooperation function B is a period from a time point t2 to a time point t4. The execution periods are designated by, for example, users setting the cooperation functions.

The execution period of the cooperation function A and the execution period of the cooperation function B overlap each other from the time point t2 to the time point t3. In other words, in the period from the time point t2 to the time point t3, the cooperation functions A and B contradictory to each other are set in the lighting apparatus B. In this case, the warning processing unit 32 performs a warning process.

For example, in a case where the cooperation function A is already set and is registered in the function management table, and a setting instruction for the cooperation function B is given later, the warning processing unit 32 transmits warning information to the terminal apparatus 10 associated with a user having given the setting instruction for the cooperation function B. Consequently, the warning information is displayed on the UI section 18 of the terminal apparatus 10. For example, the warning information illustrated in FIG. 7 is displayed. In this case, the setting unit 30 does not set the cooperation function B in the opening/closing sensor A and the lighting apparatus B. In other words, the setting unit 30 does not register the cooperation function B in the function management table. In the above-described way, the user having given the setting instruction for the cooperation function B can recognize a problem which may occur in a case where plural functions are set in the configuration before setting of the cooperation function B is completed.

As another example, in the same manner as in Modification Example 2, the setting unit 30 may set both of the cooperation functions A and B in the opening/closing sensor A and the lighting apparatus B. In other words, the setting unit 30 registers both of the cooperation functions A and B in the function management table. In this case, the control unit 28 of the relay apparatus 14 executes each of the cooperation function A and the cooperation function B in periods in which the execution periods do not overlap each other, and executes either the cooperation function A or the cooperation function B in a period in which the execution periods overlap each other. Of course, the control unit 28 may not execute either of the cooperation functions A and B in the period in which the execution periods overlap each other. In the above-described way, it is possible to prevent the occurrence of a problem which may occur when plural functions are set while executing a set function.

Specifically, the period from the time point t1 to the time point t2 is a period included in the execution period of the cooperation function A, is a period not overlapping the execution period of the cooperation function B. In this case, the control unit 28 executes the cooperation function A in period from the time point t1 to the time point t2. Similarly, the period from the time point t3 to the time point t4 is a period included in the execution period of the cooperation function B, is a period not overlapping the execution period of the cooperation function A. In this case, the control unit 28 executes the cooperation function B in period from the time point t3 to the time point t4. In contrast to the periods, the execution periods of the cooperation functions A and B overlap each other in the period from the time point t2 to the time point t3, and thus the control unit 28 executes either of the cooperation functions A and B. An executed function may be designated by the user when the cooperation function B is set, and may be designated by the user at the time point t2. The control unit 28 may not execute either of the cooperation functions A and B in the period from the time point t2 to the time point t3.

Figure 12:
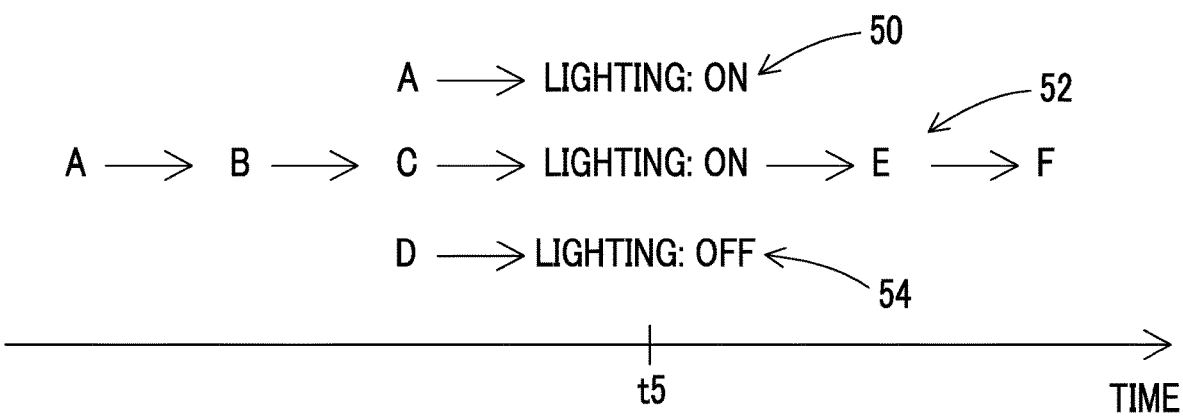
FIG. 12 is a diagram illustrating a cooperation function execution period.

FIG. 12 illustrates still another example. Reference numerals 50, 52, and 54 respectively indicate cooperation functions. The cooperation function 50 is a function in which, for example, a detection result in an instrument A serves as a trigger, and a lighting apparatus is lighted. The cooperation function 52 is a function in which a detection result in the instrument A serves as a trigger, and an instrument B is operated; a detection result in the instrument B serves as a trigger, and an instrument C is operated; a detection result in the instrument C serves as a trigger, and the lighting apparatus is operated; the lighting serves as a trigger, and an instrument E is operated; and a detection result in the instrument E serves as a trigger, and an instrument F is operated. The cooperation function 54 is a function in which a detection result in the instrument D serves as a trigger, and the lighting apparatus is unlighted.

Execution periods of the cooperation functions 50, 52, and 54 are not set, but, depending on a detection result in each instrument, at an identical time point t5, lighting of the lighting apparatus in the cooperation function 50, lighting of the lighting apparatus in the cooperation function 52, and unlighting of the lighting apparatus in the cooperation function 54 may be performed. Lighting and unlighting of the lighting apparatus are operations contradictory to each other, and thus it can be said that the cooperation functions 50 and 52 and the cooperation function 54 are functions executing operations contradictory to each other. Since a detection result in the instrument A serves as a trigger and the lighting apparatus is lighted in the cooperation function 50, and a detection result in the instrument C serves as a trigger and the lighting apparatus is lighted in the cooperation function 52, the cooperation functions 50 and 52 may also execute operations contradictory to each other. Therefore, in a case where any one of the cooperation functions 50, 52, and 54 is already set, and a setting instruction for at least one of the other two cooperation functions is given, the warning processing unit 32 performs a warning process. In the above-described way, it is possible to prevent plural functions contradictory to each other from being set in an identical configuration.

Each of the terminal apparatus 10 and the relay apparatus 14 is realized through cooperation between hardware and software as an example. Specifically, each of the terminal apparatus 10 and the relay apparatus 14 includes one or plural processors such as CPUs (not illustrated). The one or plural processors read a program stored in a storage device (not illustrated) and execute the program, and thus a function of each unit of each of the terminal apparatus 10 and the relay apparatus 14 is realized. The program is stored in a storage device via a recording medium such as a CD or a DVD, or a communication path such as a network. As another example, each unit of each of the terminal apparatus 10 and the relay apparatus 14 may be realized by a hardware resource such as a processor, an electronic circuit, or an application specific integrated circuit (ASIC). A device such as a memory may be used for the realization. As still another example, each unit of each of the terminal apparatus 10 and the relay apparatus 14 may be realized by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a control unit, comprising:
a processor; and
a memory,
wherein the processor is configured to be used by a user to set a first function and a second function in a function management table by respectively defining a plurality of first configurations utilized by the first function to perform a first process and a plurality of second configurations utilized by the second function to perform a second process, wherein each of the plurality of first and second configurations includes an instrument or software,
wherein the processor is configured to, before the setting of the first and second function is complete, control a notification of a warning to the user in a case where the plurality of first and second configurations includes a same configuration that is to be utilized by the first function to perform the first process and by the second function to perform the second process, and in a case where executions of the first function and the second function are configured to operate the same configuration in a contradictory manner at the same time,
wherein the processor is configured to execute one of the first function and the second function after the setting of the first and second function is complete, and after the contradiction between the first process and the second process is resolved,
wherein the function management table comprises a user identification information of the user setting the first function and the second function, a function identification information being used to identify the first function and the second function, the plurality of first and second configurations, and the first process and the second process, and wherein the user identification information, the function identification information, the plurality of first and second configurations, and the first process and the second process are correlated with each other.

2. The information processing apparatus according to claim 1,
wherein, in a case where an execution condition of the first function is the same as an execution condition of the second function, the processor controls the notification of the warning.

3. The information processing apparatus according to claim 2,
wherein the execution condition is a condition regarding an execution period, and
wherein, in a case where an execution period of the first function partially overlaps an execution period of the second function, the processor controls the notification of the warning.

4. The information processing apparatus according to claim 1,
wherein the processor cancels the setting of the second function, and sets the first function utilizing the plurality of first configurations.

5. The information processing apparatus according to claim 4,
wherein, in a case where an instruction for the cancellation is given by a user having an authority to perform the cancellation, the processor cancels the setting of the second function, and sets the first function utilizing the plurality of first configurations.

6. The information processing apparatus according to claim 4,
wherein the processor further controls a notification of the cancellation sent to a user having given an instruction for setting the second function.

7. The information processing apparatus according to claim 4,
wherein the processor controls a notification of the cancellation sent to a user having a predefined authority.

8. The information processing apparatus according to claim 1,
wherein the processor sets the first function utilizing the first configurations, controls execution of one of the first function or the second function, and does not execute the other of the first function or the second function.

9. The information processing apparatus according to claim 8,
wherein, in a case where an execution period of the first function partially overlaps an execution period of the second function, the processor controls execution of each of the first function and the second function in a non-overlapping period, and controls execution of either the function or the second function in an overlapping period.

10. The information processing apparatus according to claim 8,
wherein the first function and the second function are selected by a user.

11. The information processing apparatus according to claim 1,
wherein each of the plurality of first and second configurations include files.

12. The information processing apparatus according to claim 1,
wherein the processor is configured to control the notification of the warning when the processor sets one of the first function and the second function while other one of the first function and the second function is already set in the function management table.

13. An information processing apparatus comprising:
a control unit, comprising:
a processor; and
a memory,
wherein the processor is configured to be used by a user to set a first function and a second function in a function management table by respectively defining a plurality of first configurations utilized by the first function to perform a first process and a plurality of second configurations utilized by the second function to perform a second process, wherein each of the plurality of first and second configurations includes an instrument or software,
the processor is configured to determine, before the setting of the first and second function is complete, to not execute the second function utilizing the plurality of second configurations, while the first function utilizing the plurality of first configuration executes, in a case where the plurality of first and second configurations includes a same configuration that is to be utilized by the first function to perform the first process and by the second function to perform the second process, and in a case where executions of the first function and the second function are configured to operate the same configuration in a contradictory manner at the same time, wherein the processor is configured to execute the first function after the setting of the first and second function is complete, wherein the function management table comprises a user identification information of the user setting the first function and the second function, a function identification information being used to identify the first function and the second function, the plurality of first and second configurations, and the first process and the second process, and wherein the user identification information, the function identification information, the plurality of first and second configurations, and the first process and the second process are correlated with each other.

14. A non-transitory computer readable medium storing a program causing a computer to function as:

a processor configured to be used by a user to set a first function and a second function in a function management table by respectively defining a plurality of first configurations utilized by the first function to perform a first process and a plurality of second configurations utilized by the second function to perform a second process, wherein each of the plurality of first and second configurations includes an instrument or software, wherein, before the setting of the first and second function is complete, the processor controls a notification of a warning to the user in a case where the plurality of first and second configurations includes a same configuration that is to be utilized by the first function to perform the first process and by the second function to perform the second process, and in a case where executions of the first function and the second function are configured to operate the same configuration in a contradictory manner at the same time, wherein the processor is configured to execute one of the first function and the second function after the setting of the first and second functions is complete, and after the contradiction between the first process and the second process is resolved, wherein the function management table comprises a user identification information of a user setting the first function and the second function, a function identification information being used to identify the first function and the second function, the plurality of first and second configurations, and the first process and the second process, and wherein the user identification information, the function identification information, the plurality of first and second configurations, and the first process and the second process are correlated with each other.

15. A non-transitory computer readable medium storing a program causing a computer to function as:

a processor that is configured to be used by a user to set a first function and a second function in a function management table by respectively defining a plurality of first configurations utilized by the first function to perform a first process and a plurality of second configurations utilized by the second function to perform a second process, wherein each of the plurality of first and second configurations includes an instrument or software, wherein the processor is configured to determine, before the setting of the first and second function is complete, to not execute the second function utilizing the plurality of second configurations, while the first function utilizing the plurality of first configurations executes, in a case where the plurality of first and second configurations includes a same configuration that is to be utilized by the first function to perform the first process and by the second function to perform the second process, and in a case where executions of the first function and the second function are configured to operate the same configuration to perform the first process and the second process in a contradictory manner at the same time, wherein the processor is configured to execute of the first function after the setting of the first and second function is complete, wherein the function management table comprises a user identification information of a user setting the first function and the second function, a function identification information being used to identify the first function and the second function, the plurality of first and second configurations, and the first process and the second process, and wherein the user identification information, the function identification information, the plurality of first and second configurations, and the first process and the second process are correlated with each other.

* * * * *